United States Patent
Liu et al.

(10) Patent No.: US 8,856,131 B1
(45) Date of Patent: Oct. 7, 2014

(54) COMPUTER NETWORKED SELECTING OF CONSUMER INTERESTS

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 13/523,616

(22) Filed: Jun. 14, 2012

(51) Int. Cl.
*G06F 7/04* (2006.01)
*G06F 17/30* (2006.01)

(52) U.S. Cl.
USPC ............ 707/738; 707/737; 707/748; 707/749

(58) Field of Classification Search
None
See application file for complete search history.

(56) References Cited

U.S. PATENT DOCUMENTS

| | | | | |
|---|---|---|---|---|
| 8,082,245 | B2* | 12/2011 | Bates et al. | 707/724 |
| 2011/0035384 | A1* | 2/2011 | Qiu | 707/748 |
| 2012/0047150 | A1* | 2/2012 | Spiegel | 707/748 |
| 2014/0011595 | A1* | 1/2014 | Muller | 463/42 |

* cited by examiner

*Primary Examiner* — Bruce Moser
(74) *Attorney, Agent, or Firm* — Foley and Lardner LLP; John D. Lanza

(57) ABSTRACT

Systems and methods of selecting consumers to receive content on a computer network are provided. A user list identifying a first plurality of users having a group of features corresponding to internet activity of the first plurality of users can be obtained at a computing device. A subgroup of features can be selected from the group of features, and a cluster of users of the first plurality of users can be identified. The users of the cluster of users can each have at least one feature of the subgroup of features. A supplemental user having a supplemental feature can be identified. A correlation between the supplemental feature and at least one feature of the subgroup of features can be determined, and an expanded user list that includes at least one of the first plurality of users and the supplemental user can be generated.

18 Claims, 3 Drawing Sheets

COMPUTER NETWORKED SELECTING OF CONSUMER INTERESTS

BACKGROUND

In a networked environment such as the Internet, entities such as people or companies provide information for public display on web pages. The web pages can include text, video, or audio information provided by the entities via a web page server for display on the Internet. Additional content such as advertisements can also be provided by third parties for display on the web pages together with the information provided by the entities. Thus, a person viewing a web page can access the information that is the subject of the web page, as well as third party advertisements that may or may not be related to the subject matter of the web page.

SUMMARY

At least one aspect is directed to a computer implemented method of selecting consumers to receive content on a computer network. The method obtains, at a data processing system, a user list. The user list indicates a first plurality of users each associated with at least one of a group of features that correspond to Internet activity of the first plurality of users. The group of features includes information about at least one of URL visits, Internet browsing activity, link activity, and conversion information of each of the first plurality of users. The method selects a subgroup of features from the group of features, and identifies a cluster of users of the first plurality of users. Each user of the cluster of users can be associated with at least one particular feature of the subgroup of features. The method identifies, from a second plurality of users, a supplemental user having a supplemental feature. The supplemental feature includes information about at least one of URL visits, Internet browsing activity, link activity, and conversion information of the supplemental user. The method determines a correlation between the supplemental feature and one of the at least one particular feature of the subgroup of features, and the method generates an expanded user list. The expanded user list comprises at least one user of the cluster of users and the supplemental user.

At least one aspect is directed to a system of identifying consumers to receive content via a computer network. The system includes at least one data processing system including at least one of a feature selection circuit and a user list modification circuit. The at least one data processing system can obtain a user list. The user list indicates a first plurality of users each associated with at least one of a group of features that correspond to Internet activity of the plurality of users. The group of features includes information about at least one of uniform resource locator (URL) visits, Internet browsing activity, link activity, and conversion information of each of the plurality of users. The data processing system can select a subgroup of features from the group of features, and can identify a cluster of users of the plurality of users. Each user of the cluster of users can be associated with at least one particular feature of the subgroup of features. The data processing system can identify a supplemental user associated with at least a supplemental feature. The supplemental feature can include information about at least one of URL visits, Internet browsing activity, link activity, and conversion information of the supplemental user. The data processing system can determine a correlation between the supplemental feature and one of the at least one particular feature of the subgroup of features, and can generate an expanded user list. The expanded user list can comprise at least one user of the cluster of users and the expanded user list can include the supplemental user.

At least one aspect is directed to a computer readable storage medium having instructions to provide content on a computer network. The instructions include instructions to obtain a user list. The user list can indicate a plurality of users each associated with at least one of a group of features corresponding to Internet activity of the plurality of users. The group of features can include information about at least one of URL visits, Internet browsing activity, link activity, and conversion information of each of the plurality of users. The instructions include instructions to select a subgroup of features from the group of features, and to identify a cluster of users of the first plurality of users. Each user of the cluster of users can be associated with at least one particular feature of the subgroup of features. The instructions include instructions to identify a supplemental user associated with at least a supplemental feature. The supplemental feature can include information about at least one of URL visits, Internet browsing activity, link activity, and conversion information of the supplemental user. The instructions can include instructions to determine a correlation between the supplemental feature and one of the at least one particular feature of the subgroup of features, and to generate an expanded user list. The expanded user list can comprise at least one user of the cluster of users and the supplemental user.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
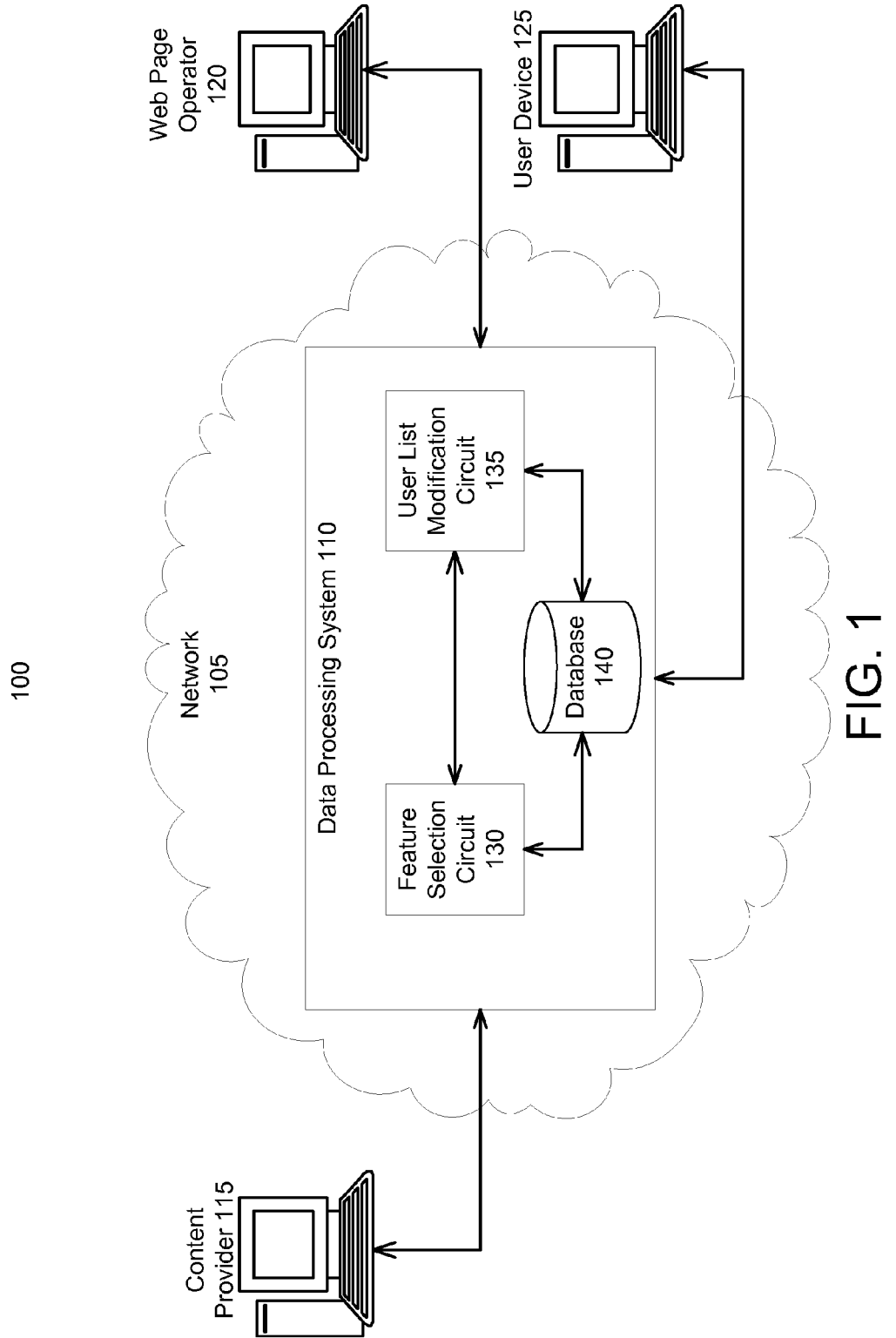
FIG. 1 is a block diagram of an example environment to identify consumers selected to receive content via a computer network, according to an illustrative implementation.

Following below are more detailed descriptions of various concepts related to, and embodiments of, methods, apparatuses, and systems of selecting consumers to receive content on a computer network. The various concepts introduced above and discussed in greater detail below may be implemented in any of numerous ways, as the described concepts are not limited to any particular manner of implementation. Examples of specific implementations and applications are provided primarily for illustrative purposes.

In some implementations described herein the systems and methods can detect, infer, or identify computer network based activity of computing devices that a user is manipulating to access information on the computer network. The activity of users on the content network can be maintained in an anonymous fashion so that individuals cannot be identified from the user activity. Furthermore, the user activity information can be collected on an opt-in basis, and users can opt out of the collection of their user activity information. The users can be represented by identifiers associated with a computing device, for example using a cookie or user profile information without regard to the actual identity of the individual person using the computing device.

One implementation is directed toward expanding user lists to provide content such as advertisements to a particular audience to whom the content may be most relevant. A user list can be obtained. The user list can indicate, for example, a list of users determined to have an interest in a product or service, such as "cars." The user list can include a group of users and indicate their corresponding features. The features relate, for example, to Internet activity of the users such as URL or web page visits, link activity and conversions. A subgroup of the features can be selected and associated with a cluster of users. The cluster of users can have a more specific interest relative to the interest of the user list in general (e.g., "cars"), such as a determined interest of a cluster of users in "convertible cars." The features of the subgroup of features generally have similarities or common characteristics. A particular feature of the subgroup can indicate link activity associated with a particular product, such as users clicking on a link to advertisements in a particular category. For example, via Internet activity some users on the user list of users interested in "sports" can have a feature that indicates an interest in identified content, such as a particular sports team. This group of users can be identified based on their Internet activity as a cluster of users within the user list that share a subfeature of Internet activity related to a particular sports team, for example.

The user lists can be expanded to include additional users who are determined to have similar features to at least some of the users on the user list. For example, a data processing system can determine that a supplemental user not on the user list also has an interest on one of the clusters of the user list, e.g. the same particular sports team. If this supplemental user's interest is determined to be sufficiently strong based for example on Internet activity of the supplemental user, the data processing system can add the supplemental user to the user list as well as to any relevant cluster of users. This enhances the user list by adding new users having similar features, such as similar Internet activity, habits or preferences.

Thus, a user list, for example received from an advertiser, can be expanded by adding new users having sufficiently similar characteristics or features to the features of those already on the list. The users on the user list can also be organized into clusters that include users who share a common subfeature of the user list. The expanded list can more effective for online advertising purposes because it includes more users determined to have an interest in identified subject matter that may be exposed to an ad campaign, for example.

FIG. 1 illustrates an example system 100 to identify users that may receive content via a computer network 105. The network 105 can include computer networks such as the Internet, local, wide, or metro area networks, intranets, and other computer networks such as mobile phone voice or data communication networks. The system 100 can include at least one data processing system 110. The data processing system 110 can include at least one logic device such as a computing device having a processor to communicate via the network 105 with at least one content provider 115, at least one web page operator 120, or at least one user device 125. The data processing system 110 can also include at least one feature selection circuit 130, at least one user list modification circuit 135, and at least one database 140.

The content provider 115 can include a computing device to aggregate information about user activity on the network 105 (e.g., Internet activity) from a plurality of user devices 125. For example, the content provider 115 can include an advertiser or data aggregation service that uses a computing device (e.g., a server) to obtain information about user activity on the network 105. From this collected information, the content provider 115 can generate a user list. The user lists indicates a group of user devices 125 (which may be attributed to their associated users) that share common features related for example to Internet activity. For example, a server of the content provider 115 can determine that a group of user devices 125 share a common interest in this year's football championship game based on a determination that the group of user devices 125 have each separately accessed a web page of the web page operator 120 having content about one of the teams playing in the championship. The features can be based on short term Internet activity of the user (e.g., within a previous 24 hours) or long term Internet activity of the user, (e.g., within the previous 30 days).

In one implementation, the data processing system 110 obtains the user list. For example, the data processing system can receive a user list from the content provider 115. In this example, the content provider 115 can generate the list of users based on user activity and identified generically by a cookie or by an IP address of the user device 125, for example. The data processing system 110 can access the user list from a memory unit associated with the content provider 115, or the data processing system 110 can receive the user list from the content provider 115 via the network 105 and store the user list, for example in the database 140. In one implementation, the data processing system 110 generates the user list based on information the data processing system 110 receives about network activity of a plurality of user devices 125, and does not, in this example, receive the user list from the content provider 115.

The users identified on the user list (e.g., anonymously) generally have some level of activity on the network 105. For example, the user devices 125 access the network 105 to browse or interact with content on the Internet, and the web page operator 120 can operate a web page that is accessed by the user of the user device 125. In this example, the user device 125 can access a web server of the web page operator 120 to request a rendering or impression of the web page on a web browser of the user device 125. In some implementations the content provider 115 or the data processing system 110 can receive indications of user device 125 activity (e.g., cookies) via the network 105 from the web page operator 120 or from the user device 125. Features associated with users on the user list can indicate information derived from this Internet activity, such as a user interest in a product, service, or category of information.

In one implementation the content provider 115 and the web page operator 120 can be the same entity, operated by the same entity, or can share the same servers or other computing devices. For example, the web page operator 120 can aggregate information about user devices 125 that access a web page server and can use this information to generate user lists that can be provided to and received by the data processing system 110.

The user lists received at or generated by the data processing system 110 can include information about activity of a group of user devices 125 on the network 105. This information may be referred to as features corresponding to Internet activity of the users on the user list. These features can include, for example, information about the names or content of web pages that were accessed by the user via their corresponding user device 125. The features can also include conversion information (e.g., whether or not the user who accessed an online advertisement converted the advertisement by purchasing a product or taking other action requested by the advertisement). The features can also include URL or web page visits, information about access to domain names, the content of accessed web pages, Internet browsing activity, or link activity (e.g., the particular links or type of links a user clicked on) for example.

In one implementation, the data processing system 110 receives the user list including information about features corresponding to Internet activity of a plurality of users via corresponding user devices 125. From this information, the data processing system 110 can identify a subset of the group of features included in the user list. For example, the feature selection circuit can select a subgroup of features from the plurality of features associated with the user list.

The user list obtained by the data processing system 110 can include a large number (e.g., thousands) of users of the network 105. Due to network 105 activity, individual users can have many features, and some features may be less relevant to a user list. The data processing system 110 can organize the features in a hierarchical fashion based on their relevance to the user lists. For example, the content provider 115 may provide user lists directed toward users having an interest in purchasing a late model sedan in the last 30 days. In this example the content provider 115 or the data processing system 110 determine that the users, via their user devices 125, partook in activity on the network 105 related to cars, or indicated an interest via the network 105 to purchase a sedan. The users on this user list may also have features that are less related or unrelated to cars. For example, some users may have expressed an interest in child car safety seats (e.g., determined by the data processing system 110 to be minimally related to purchasing a late model sedan) or content determined by the data processing system 110 unrelated to a car purchase, such as instructions for grilling cheeseburgers, for example.

In one implementation, the data processing system 110 selects a subgroup of features from the features of the user list. For example, the feature selection circuit 130 can select features determined to be most relevant to the user list. Continuing with the late model sedan user list example, the feature selection circuit 130 can evaluate the features associated with users on the list to identify a set of relevant features. In one implementation, the feature selection circuit 130 or other data processing system 110 component having a logic device such as a processor can identify a predetermined number (e.g., five or another number) of features determined to be most relevant.

In one implementation, the frequency selection circuit 130 can measure the similarity between features and compare the resulting score (e.g., a similarity metric) to a threshold value to identify the relevancy of features. For example, the feature selection circuit 130 can evaluate features of the user list and determine that the feature of child car safety seats and a feature of car booster seats have a high degree of relevance that is above a threshold value. In this example, the feature selection circuit 130 (or other data processing system 110 component) can identify the car booster seat feature and the child car seat feature as having related content, and can classify these features as a subgroup of the features of a user list that generally indicates users with an interest in car accessories.

To classify features as having related content or belonging in the same subgroup, the data processing system 110 can, for example, evaluate the content of a plurality of web pages available via the network 105 to determine that content about child car seats, or the term "child car seat" and content about car booster seats, or the term "car booster seats" appear together on a threshold number of percentage of web pages about car accessories. In one implementation, the data processing system 110 disregards features from the user lists that are not sufficiently similar to other features. For example, the data processing system 110 obtains a user list directed toward users having an interest in cars. Some users on this list may be associated with features unrelated to cars (e.g., a feature about do it yourself home roof repair) based on Internet activity of the users that is unrelated to cars. In this example, the feature selection circuit 130 can identify the unrelated features, for example by determining that web pages having content about cars make little or no mention of how to repair your roof. From the determination, the feature selection circuit 130 can disregard or remove the unrelated feature from the user list.

The data processing system 110 can also supplement the user list by adding additional features to the user lists that are not part of the user lists obtained by the data processing system 110. For example, the user lists can identify some users having the child car seat feature, but the car booster seat feature may be absent from the user list. In this example, the data processing system 110 identifies the feature car booster seat as being sufficiently similar to child car seat and adds this feature to the user list. In one implementation, the data processing system 110 identifies content of a plurality of web pages available via the network 105 and web page servers of web page operators 120 to identify a correlation between these two features based on a determination that they appear together on the same or similar web pages. The data processing system 110 can assign a score to or otherwise rank these additional features based on their similarity to a given feature. The score may be used to place the features of the user list, including additional features added by the data processing system 110, in a hierarchical taxonomy such as a vertical listing or hierarchical tree structure. In one example, a higher score indicates a closer similarity between two or more features than a lower score.

In one implementation, the score can indicate a semantic closeness of different terms that may be synonyms. For example, given two terms the data processing system 110 can determine a number of documents having both terms, and divide this number by the number of documents containing either of the two terms. The resulting score indicates the level of similarity of different terms or features, for example from zero indicating no similarity to one indicating a high level of similarity. A synonym term sufficiently similar (e.g., above a threshold similarity value) to a term on a user list can be added to that user list. In another example, the data processing system 110 can identify a predetermined score for a term from the database 140, and can assign this score to other terms that are synonyms of that term. The data processing system 110 can adjust this score based on metrics such as a click through rate of web pages that include the synonyms. For example, the score may be adjusted upwards based on a high click through rate of a synonym term, where the click through rate is the number of clicks on an advertisement containing a term divided by the number of impressions of that advertisement, for example. Based on an upward adjustment to the score of the synonym term, the data processing system 110 may add that term to a user list. In another example, the data processing system 110 determines the score based on a frequency of occurrence of a term in a set of web pages or other documents.

In one implementation, the data processing system 110 identifies a cluster of users from the users of the user list. The cluster of users can include a subgroup of users from the user list that share one or more features from the features of the user list. For example, the feature selection circuit 130 can select a subgroup of features of the user list, and the data processing system 110 can identify the users from the user list that are associated with one of the subgroup of features due to Internet activity of those users via the user device 125.

The data processing system 110 can create multiple clusters of users for a user list, each cluster having a subgroup of features and including the users associated with those subgroups of features. A user identified on a user list can belong to more than one cluster of that user list. In one implementation the data processing system 110 scores the features of the users to determine the nearest neighbors to the users of the users list, e.g., to identify subgroups of users of the user list with the closest matching features.

In some implementations the data processing system 110 creates one cluster from the user list. For example, the data processing system 110 can have a user list for users interested in purchasing a car. In this example, the feature selection circuit 130 can identify a subgroup of features as being relevant to car purchases. The data processing system 110 can identify a cluster corresponding to this subgroup, and one feature of the subgroup can be identified as a centroid of the cluster, e.g., the feature most determined by the data processing system to be most relevant to the cluster. The feature selection circuit 130 can assign scores to other features to determine the similarity of the other features to the centroid of the cluster. Features that are sufficiently similar (e.g., within a tolerance range of the centroid) can be included as part of the subgroup together with their associated users. These features can include other features of the user list or supplemental features not included on the user list. The data processing system 110 can identify centroids of more than one cluster when the use list includes a plurality of clusters.

In some implementations, the data processing system 110 identifies at least one supplemental user. The supplemental user can be a user of at least one user device 125 that accesses web pages from at least one web page operator 120 via the network 105. For example, the data processing system 110 can identify a supplemental user that is browsing the Internet. In one implementation, the supplemental user is absent from the user list obtained by the data processing system. From network 105 activity of the supplemental user, the data processing system 110 can obtain or determine at least one supplemental feature of the supplemental user. The supplemental feature of the supplemental user can include information about web page or URL visits, Internet browsing activity, link activity (e.g., an identification of the links on a web page that the supplemental user clicked on as well as the content of the web pages associated with those links,) or conversion information of the supplemental user.

The data processing system 110 or its components such as the user list modification circuit 135 can determine a correlation between supplemental features of the supplemental user and at least one of the features of the user list. For example, the data processing system 110 can determine that the supplemental feature is the same as or a synonym of a feature associated with users on the user list. The supplemental feature can also be different than features of the user lists, and the user list modification circuit 135 can identify a correlation between the supplemental feature and one or more of the features that form the subgroup of features based on a similarity between the features.

For example, a feature of a supplemental user can indicate a user interest in "vehicular child restraints." This supplemental feature is different than both the "child car seat" and "car booster seats" of the user list. In this example, the data processing system 110 can determine that the supplemental feature is similar to either or both of the user list features. In one implementation, the data processing system 110 assigns a score or weight to the supplemental feature that indicates its level of similarity to one or more features of the user list. For example, the data processing system can evaluate or receive an evaluation of content (e.g., web pages) available via the network 105 that indicates how often the feature and the supplemental feature appear together on various web pages, and can determine a score indicative of this correlation.

In one implementation, the user list modification circuit 135 (or other data processing system 110 component) can expand the user list to generate an expanded user list that includes at least one supplemental user not originally present on the user list. For example, the data processing system 110 can identify a supplemental feature associated with a supplemental user and determine that the supplemental feature is related to (e.g., a synonym of) a feature of users on the user list. In this example, the data processing system 110 can expand the user list to include the supplemental user or to indicate the supplemental feature. In one implementation, the data processing system 110 includes the supplemental user in one or more of the clusters of users, when for example the supplemental feature is the same as or similar to one of the features of the subgroup of features of a cluster.

In one implementation, the user list modification circuit 135 adds a supplemental user to the user list. For example, the data processing system 110 can determine a score of supplemental feature of the supplemental user and compare it with the centroid feature of the user list (or cluster thereof). When the score of the supplemental feature is within a tolerance range of the centroid of the user list or cluster, the user list modification circuit 135 can add the supplemental user to the user list as well as one or more clusters of the user list.

In some implementations, the user list modification circuit 135 adjusts the number of users on the user list. Users can be added to or eliminated from the user list. For example, the data processing system 110 can determine that some features associated with users on the user list are insufficiently relevant to belong in any subgroup of features. The user list modification circuit 135 can identify users associated with less relevant features and remove those uses from the user list. The user list modification circuit 135 can adjust membership of the user list by adding users to or removing users from the user lists before or after the user list has been expanded to include supplemental users.

Thus, in some implementations the data processing system 110 obtains a user list and manipulates the user list to create clusters of related users based on commonalities between features of those users. The clusters can identify users having a more particular interest than the more general interest indicated by the user list. For example, the data processing system 110 can obtain a user list identifying users interested in "cars" based on Internet activity (e.g., features) of those users. The feature selection circuit 130 can identify and aggregate subgroups of features to create clusters of users. In this example, one cluster might indicate users interested in purchasing a late model sedan. Other clusters might indicate users interested in sports cars, or selling cars, car races, or car shows. The data processing system 110 can also expand the obtained user list by adding supplemental users determined by the data processing system 110 to be interested in, for example, cars based on an evaluation of the features of the supplemental users. The user list modification circuit 135 can add the supplemental users and their supplemental features to the user list in general, or to one or more clusters of the user list. The data processing system 110 can also identify supplemental features similar to the features of the users on the user list, and use the supplemental features to identify a supplemental user, who can then be added to the user list together with the supplemental feature.

In some implementations, the user list is used by the data processing system 110 to provide content such as advertisements to users who view a web page. For example, a user of the user device 125 can communicate via the network 105 with a web page server of the web page operator 120 to request access to a web page. In response, the data processing system 100 can receive a request from the web page operator 120 to provide an advertisement for display in an ad slot of the web page. The data processing system 110 can determine that the user is on the user list indicating an interest in cars (or one of the more specific interests associated with a cluster of users of the user list) and can provide an advertisement about cars to the web page operator 120 for display with the web page at user device 125. The advertisement can be content originating from the content provider 115 or other content provider, such as an advertiser. In one example, the user requesting access to the web page is identified as a supplemental user based on Internet activity and added to the user list.

Figure 2:
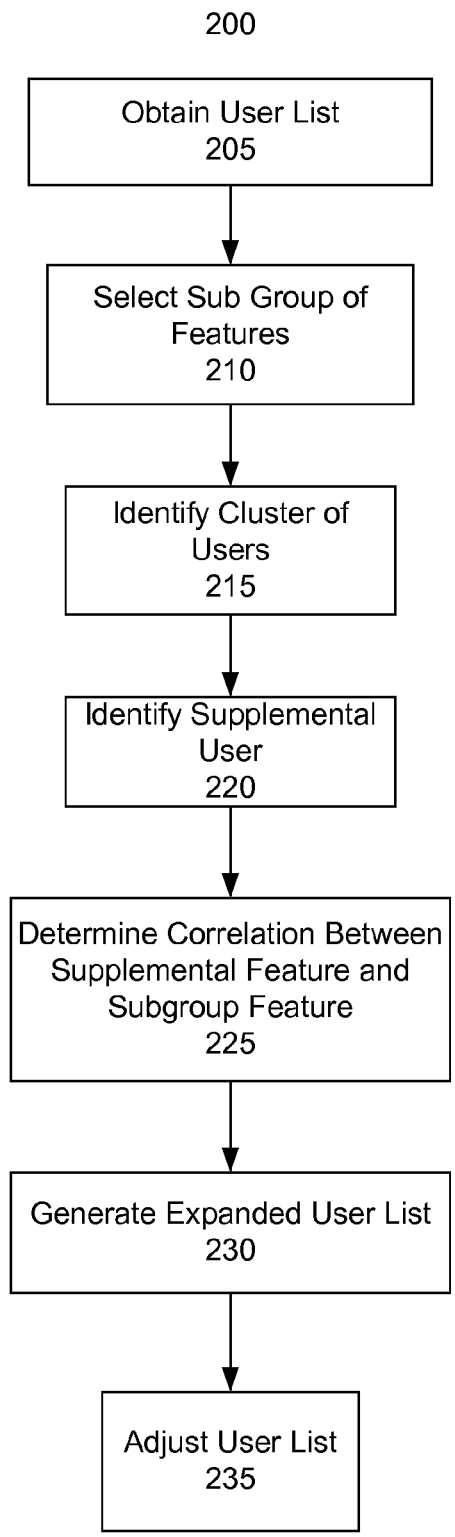
FIG. 2 is a flow diagram depicting a method of selecting consumers to receive content on a computer network, according to an illustrative implementation.

FIG. 2 illustrates a flow diagram depicting a method 200 of selecting consumers to receive content on a computer network. The method 200 can obtain a user list (BLOCK 205). For example a user list can by obtained by a data processing system from a database or from a content provider via a network such as the Internet. In one implementation, the method 200 obtains at least one user list (BLOCK 205) that indicates a list of users having features corresponding to their Internet activity. The features can include information about Internet browsing activity, web page visits, activity taken on web pages, or the content of visited web pages for example. The features can indicate a user interest.

The method 200 can also select a subgroup of features from the features associated with users on the user list (BLOCK 210). For example, features having a threshold level of similarity with each other can be identified as part of a subgroup of features. The selected subgroup of features (BLOCK 210) can be different features related to common subject matter. For example, the method 200 can be implemented on a computing device to determine that a feature that expresses a user interest in child safety seats and another feature that expresses a user interest in child booster seats are related to each other. In this example, these different features can be included as part of a selected subgroup of features.

In one implementation, the method 200 identifies from the user list a cluster of users. (BLOCK 215). For example, the identified cluster of users (BLOCK 215) can include the users from the user lists having one of the selected subgroup of features (BLOCK 210). For example, if the subgroup of features includes child booster seat and child safety seat features, the cluster of users is the users from the user list having at least one of these two features.

The method 200 can also identify a supplemental user (BLOCK 220). The supplemental user can be a user with at least one feature related for example to Internet activity but that is not on the user list. The method 200 can determine a correlation between features of the supplemental user and features of the users who are on the user list (BLOCK 225). In one implementation, the method 200 determines a correlation (BLOCK 225) between a supplemental feature and a feature selected as one of the subgroup of features (BLOCK 210). For example, the method can be implemented at least in part by a data processing system that evaluates content of web pages to determine that the supplemental feature and at least one feature of the user list relate to the same or similar content.

The method 200 can also generate an expanded user list (BLOCK 230). For example, the method 200 can be implemented in part by a user list modification circuit that can expand the user list by adding at least one supplemental user or associated supplemental feature to the user list. The method 200 can also adjust the user list (BLOCK 235), for example by removing users from the user list before or after any expansions to the user list. In this example, the method 200 can determine that activity of a user on the user list (e.g., that user's features) is insufficiently relevant to the user list for that user to remain on the list and the method can adjust the user list to remove one or more users from the list.

Figure 3:
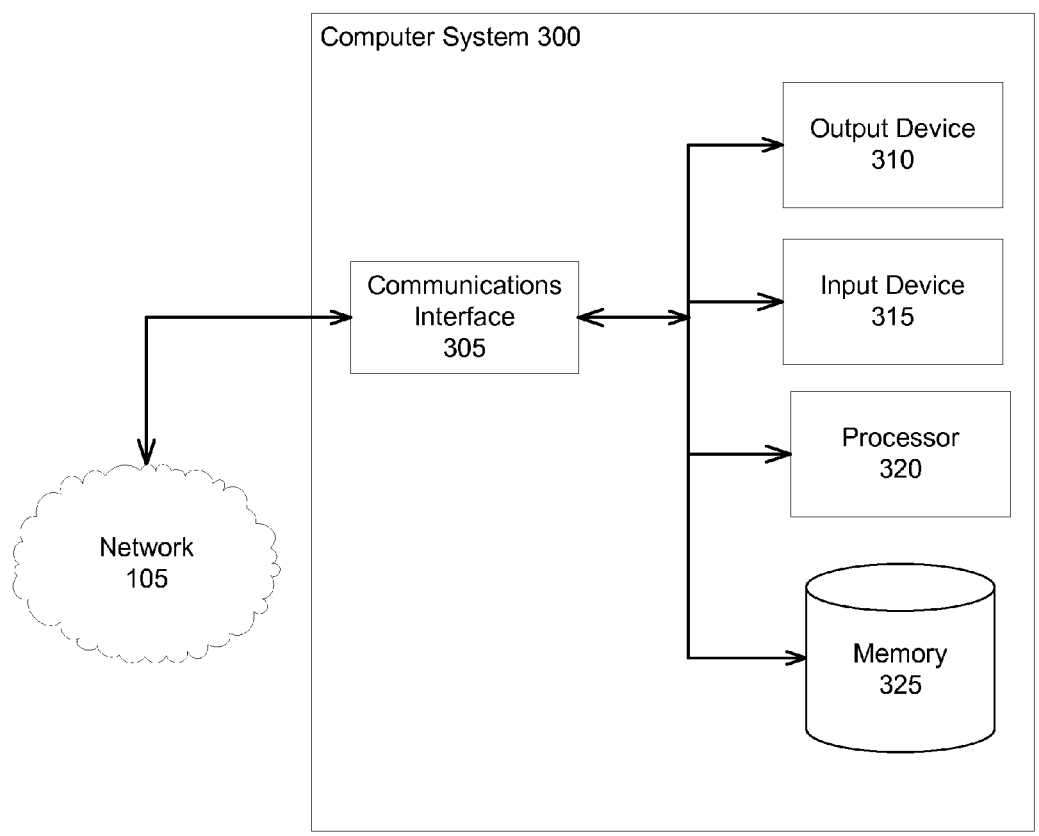
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 and its components such as the data processing system 110, the feature selection circuit 130, or the user list modification circuit 135) in accordance with some embodiments. The computer system 300 can be used to select consumers to receive content on a computer network such as the network 105 and to supplement user lists by generating expanded user lists having supplemental users who share features in common with at least some users who are members of the user list. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in the data processing system 110 or the other components of the system 100 such as the feature selection circuit 130, or the user list modification circuit 135.

In the computer system 300 of FIG. 3, the memory 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, data processing system 110 can include the memory 325, for example as part of the database 140 to store user lists, expanded user lists, or information about Internet activity of users including supplemental users used to generate expanded user lists or to identify users selected to receive content via the network 105. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided further herein.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus" "data processing system" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The feature selection circuit 130 and the user list modification circuit 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 300 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the data processing system 110, feature selection circuit 130, and user list modification circuit 135 can be a single module, a logic device having one or more processing circuits, or part of a search engine.

Having now described some illustrative implementations and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, a user may affirmatively opt to provide personally identifying information such as a name, nickname, or identifying feature to the data processing system. In this example, this information can be included on the user list. Further, examples of features related to car sales or food products are non-limiting examples. The user features can relate to products, services, or content available on networks such as the Internet. These features can be evaluated to add or remove users from user lists, and to group users of a user list into clusters that can indicate more focused user interests than the general indications of a non-clustered user list. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of selecting consumers to receive content on a computer network, comprising:
   obtaining, at a data processing system, a user list, the user list indicating a first plurality of users each associated with at least one of a group of features corresponding to internet activity of the first plurality of users, wherein the group of features includes information about at least one of URL visits, internet browsing activity, link activity, and conversion information of each of the first plurality of users;
   selecting a subgroup of features from the group of features;
   identifying a plurality of clusters of users of the first plurality of users based on the group of features corresponding to internet activity of the first plurality of users;
   identifying a first cluster of users of the first plurality of users, each user of the first cluster of users being associated with at least one particular feature of the subgroup of features;
   identifying, from a second plurality of users, a first supplemental user associated with at least a supplemental feature, the supplemental feature including information about at least one of URL visits, internet browsing activity, link activity, and conversion information of the first supplemental user;
   determining a correlation between the supplemental feature and one of the at least one particular feature of the subgroup of features;
   generating an expanded user list, the expanded user list comprising at least one user of the first cluster of users and the expanded user list including the first supplemental user;
   adding the first supplemental user to the first cluster of users; and
   adding the first supplemental user to a second cluster of the plurality of clusters.

2. The method of claim 1, further comprising:
   adjusting the expanded user list to exclude at least one user of the first plurality of users from the expanded user list.

3. The method of claim 1, further comprising:
   assigning a score to the supplemental feature;
   comparing the score with a threshold value to determine the correlation between the supplemental feature and the one of the at least one particular feature of the subgroup of features.

4. The method of claim 1, further comprising:
   assigning a first score to the supplemental feature;
   assigning a second score to at least one of the subgroup of features;
   comparing the first score with the second score to determine to add the first supplemental user to the user list to generate the expanded user list.

5. The method of claim 1, wherein the expanded user list includes each of the first plurality of users and the first supplemental user.

6. The method of claim 1, further comprising:
   selecting the subgroup of features based on a predetermined number of features of the group of features, wherein each of the predetermined number of features has a similarity metric above a threshold value.

7. The method of claim 1, further comprising:
   identifying a feature of the group of features; and
   excluding the feature from the subgroup of features.

8. The method of claim 1, wherein the subgroup of features correspond to at least one of short term internet activity of the first plurality of users within a time period of a previous 24 hours, and long term internet activity of the first plurality of users within a time period of a previous one to 30 days.

9. A computer implemented method of selecting consumers to receive content on a computer network, comprising:
   obtaining, at a data processing system, a user list, the user list indicating a first plurality of users each associated with at least one of a group of features corresponding to internet activity of the first plurality of users, wherein the group of features includes information about at least one of URL visits, internet browsing activity, link activity, and conversion information of each of the first plurality of users;
   selecting a subgroup of features from the group of features;
   identifying a cluster of users of the first plurality of users, the cluster including each of the first plurality of users, each user of the cluster of users being associated with at least one particular feature of the subgroup of features;
   identifying, from a second plurality of users, a supplemental user associated with at least a supplemental feature, the supplemental feature including information about at least one of URL visits, internet browsing activity, link activity, and conversion information of the supplemental user;

determining a correlation between the supplemental feature and one of the at least one particular feature of the subgroup of features;

generating an expanded user list, the expanded user list comprising at least one user of the cluster of users and the expanded user list including the supplemental user;

assigning a score to at least one of the group of features corresponding to internet activity of the first plurality of users;

determining a centroid of the cluster based at least in part on the score assigned to at least one of the group of features;

comparing the score assigned to at least one of the group of features with a score of the supplemental feature to determine that the supplemental user is eligible for inclusion in the cluster; and including the supplemental user in the expanded user list.

10. A system of identifying consumers to receive content via a computer network, comprising:

at least one data processing system including at least one logic device having a processor and at least one of a feature selection circuit and a user list modification circuit, the at least one data processing system configured to:

obtain, by the processor, a user list, the user list indicating a first plurality of users each associated with at least one of a group of features corresponding to internet activity of the first plurality of users, wherein the group of features includes information about at least one of URL visits, internet browsing activity, link activity, and conversion information of each of the first plurality of users;

select, by the processor, a subgroup of features from the group of features;

identify, by the processor, a plurality of clusters of users of the first plurality of users based on the group of features corresponding to internet activity of the first plurality of users;

identify, by the processor, a first cluster of users of the first plurality of users, each user of the first cluster of users being associated with at least one particular feature of the subgroup of features;

identify, by the processor, from a second plurality of users, a first supplemental user associated with at least a supplemental feature, the supplemental feature including information about at least one of URL visits, internet browsing activity, link activity, and conversion information of the first supplemental user;

determine, by the processor, a correlation between the first supplemental feature and one of the at least one particular feature of the subgroup of features;

generate, by the processor, an expanded user list, the expanded user list comprising at least one user of the first cluster of users and the expanded user list including the first supplemental user;

add, by the processor, the first supplemental user to the first cluster of users; and to add, by the processor, the first supplemental user to a second cluster of the plurality of clusters.

11. The system of claim 10, wherein the user list includes each of the first cluster of users and the first supplemental user, and wherein user list modification circuit is configured, by the processor, to adjust the expanded user list to exclude at least one user of the first plurality of users from the expanded user list.

12. The system of claim 10, further comprising the feature selection circuit configured to:

assign, by the processor, a score to the supplemental feature; and to compare, by the processor, the score with a threshold value to determine the correlation between the supplemental feature and the one of the at least one particular feature of the subgroup of features.

13. The system of claim 10, further comprising:

the feature selection circuit configured to:

assign, by the processor, a score to the supplemental feature;

assign, by the processor, a score to at least one of the subgroup of features; and the user list modification circuit configured to compare, by a processor, the score of the supplemental feature with the score of the at least one of the subgroup of features to determine to add the first supplemental user to the user list to generate the expanded user list.

14. A system of identifying consumers to receive content via a computer network, comprising:

at least one data processing system including at least one logic device having a processor and at least one of a feature selection circuit and a user list modification circuit, the at least one data processing system configured to:

obtain, by the processor, a user list, the user list indicating a plurality of users each associated with at least one of a group of features corresponding to internet activity of the plurality of users, wherein the group of features includes information about at least one of URL visits, internet browsing activity, link activity, and conversion information of each of the plurality of users;

select, by the processor, a subgroup of features from the group of features;

identify, by the processor, a cluster of users of the plurality of users, each user of the cluster of users being associated with at least one particular feature of the subgroup of features;

identify, by the processor, from a second plurality of users, a supplemental user associated with at least a supplemental feature, the supplemental feature including information about at least one of URL visits, internet browsing activity, link activity, and conversion information of the supplemental user;

determine, by the processor, a correlation between the first supplemental feature and one of the at least one particular feature of the subgroup of features;

generate, by the processor, an expanded user list, the expanded user list comprising at least one user of the cluster of users and the expanded user list including the supplemental user;

assign, by the processor, a score to at least one of the group of features corresponding to internet activity of the plurality of users;

determine, by the processor, a centroid of the cluster based at least in part on the score assigned to at least one of the group of features;

compare, by the processor, the score assigned to at least one of the group of features with a score of the supplemental feature to determine that the supplemental user is eligible for inclusion in the cluster; and to include, by the processor, the supplemental user in the expanded user list.

15. A computer readable storage medium having instructions to provide content on a computer network, the instructions comprising instructions to:

obtain a user list, the user list indicating a first plurality of users each associated with at least one of a group of features corresponding to internet activity of the first plurality of users, wherein the group of features includes information about at least one of URL visits, internet browsing activity, link activity, and conversion information of each of the first plurality of users;

select a subgroup of features from the group of features;

identify a plurality of clusters of users of the first plurality of users based on the group of features corresponding to internet activity of the first plurality of users;

identify a first cluster of users of the first plurality of users, each user of the first cluster of users being associated with at least one particular feature of the subgroup of features;

identify, from a second plurality of users, a first supplemental user associated with at least a supplemental feature, the supplemental feature including information about at least one of URL visits, internet browsing activity, link activity, and conversion information of the first supplemental user;

determine a correlation between the supplemental feature and one of the at least one particular feature of the subgroup of features;

generate an expanded user list, the expanded user list comprising at least one user of the first cluster of users and the expanded user list including the first supplemental user;

add the first supplemental user to the first cluster of users; and add the first supplemental user to a second cluster of the plurality of clusters.

16. The computer readable storage medium of claim 15, further comprising instructions to select the subgroup of features based on a predetermined number of features of the group of features, wherein each of the predetermined number of features has a similarity metric above a threshold value.

17. The computer readable storage medium of claim 15, further comprising instructions to:
identify a feature of the group of features as being a feature unrelated to the user list; and
exclude the feature unrelated to the user list from the subgroup of features.

18. The computer readable storage medium of claim 15, further comprising instructions to:
assign a score to the supplemental feature; and
compare the score with a threshold value to identify the correlation between the supplemental feature and the one of the at least one particular feature of the subgroup of features.

* * * * *